US011428112B2

(12) United States Patent
Kray et al.

(10) Patent No.: US 11,428,112 B2
(45) Date of Patent: *Aug. 30, 2022

(54) CONTAINMENT CASE ACTIVE CLEARANCE CONTROL STRUCTURE

(71) Applicant: General Electric Company, Schenectady, NY (US)

(72) Inventors: Nicholas Joseph Kray, Mason, OH (US); Nitesh Jain, Bangalore (IN); Manoj Kumar Jain, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,266

(22) Filed: Oct. 5, 2020

(65) Prior Publication Data

US 2021/0017877 A1 Jan. 21, 2021

Related U.S. Application Data

(63) Continuation of application No. 16/139,645, filed on Sep. 24, 2018, now Pat. No. 10,815,816.

(51) Int. Cl.
  *F01D 11/24* (2006.01)
  *F02C 9/18* (2006.01)
  *F02C 6/08* (2006.01)
  *F02K 3/06* (2006.01)

(52) U.S. Cl.
  CPC .............. *F01D 11/24* (2013.01); *F02C 6/08* (2013.01); *F02C 9/18* (2013.01); *F02K 3/06* (2013.01); *F05D 2220/36* (2013.01); *F05D 2240/11* (2013.01); *F05D 2260/52* (2013.01)

(58) Field of Classification Search
  CPC .. F01D 11/20; F01D 11/24; F02C 6/08; F02C 9/18; F02K 3/06
  See application file for complete search history.

(56) References Cited

U.S. PATENT DOCUMENTS

| | | |
|---|---|---|
| 3,146,992 A | 9/1964 | Farrell |
| 4,338,061 A | 7/1982 | Beitler et al. |
| 4,668,163 A | 5/1987 | Kervistin |
| 5,228,828 A * | 7/1993 | Damlis ................ F01D 11/22 |
| | | 415/173.2 |

(Continued)

OTHER PUBLICATIONS

United States Patent and Trademark Office, "Non-Final Office Action", issued in connection with U.S. Appl. No. 16/139,645, filed Feb. 18, 2020, (16 pages).

(Continued)

*Primary Examiner* — Christopher Verdier
*Assistant Examiner* — Michael K. Reitz
(74) *Attorney, Agent, or Firm* — Hanley, Flight & Zimmerman, LLC

(57) ABSTRACT

A propulsion system including a casing surrounding a fan rotor assembly is provided. An example casing includes an outer layer material, an inner layer material including first openings extended partially through the inner layer material along a radial direction of a first side of the inner layer material, and second openings extended partially through the inner layer material along the radial direction of a second side of the inner layer material opposite the first side, and a spring member coupled to the outer layer material and the inner layer material.

20 Claims, 5 Drawing Sheets

(56) References Cited

U.S. PATENT DOCUMENTS

| | | | |
|---|---|---|---|
| 5,545,007 A | | 8/1996 | Martin |
| 5,667,358 A | | 9/1997 | Gaul |
| 6,505,326 B1 | * | 1/2003 | Farral ................ G06F 30/23 |
| | | | 716/136 |
| 6,863,495 B2 | | 3/2005 | Halliwell et al. |
| 7,448,849 B1 | | 11/2008 | Webster et al. |
| 8,047,765 B2 | | 11/2011 | Wilson et al. |
| 8,973,373 B2 | | 3/2015 | Arar |
| 8,985,938 B2 | | 3/2015 | Petty |
| 9,255,489 B2 | | 2/2016 | DiTomasso et al. |
| 9,316,111 B2 | | 4/2016 | Eleftheriou et al. |
| 9,644,489 B1 | | 5/2017 | Tham et al. |
| 9,951,643 B2 | | 4/2018 | Duguay |
| 10,082,152 B2 | * | 9/2018 | Zhang ................ F04D 29/526 |
| 2003/0202876 A1 | * | 10/2003 | Jasklowski ........... F01D 11/025 |
| | | | 415/135 |
| 2009/0053042 A1 | | 2/2009 | Wilson et al. |
| 2016/0009399 A1 | * | 1/2016 | Schwarz ................ F02C 6/08 |
| | | | 415/116 |
| 2017/0363094 A1 | | 12/2017 | Kumar et al. |
| 2018/0298764 A1 | | 10/2018 | Ahmad et al. |
| 2019/0024527 A1 | * | 1/2019 | Skertic ................ F02C 6/08 |
| 2020/0095883 A1 | | 3/2020 | Kray et al. |

OTHER PUBLICATIONS

United States Patent and Trademark Office, "Notice of Allowance", issued in connection with U.S. Appl. No. 16/139,645, filed Jun. 24, 2020, (7 pages).

* cited by examiner

ID-TAG-11428112B2-START

CONTAINMENT CASE ACTIVE CLEARANCE CONTROL STRUCTURE

RELATED APPLICATION

This patent arises from a continuation of U.S. patent application Ser. No. 16/139,645, (now U.S. Pat. No. 10,815,816) which was filed on Sep. 24, 2018. U.S. patent application Ser. No. 16/139,645 is hereby incorporated herein by reference in its entirety. Priority to U.S. patent application Ser. No. 16/139,645 is hereby claimed.

FIELD

The present subject matter relates generally to active clearance control systems for propulsion systems.

BACKGROUND

Propulsion systems, such as fan assemblies for gas turbine engines or electric propulsion systems, include fan rotors that may experience hard contact or rub a surrounding containment casing under certain adverse conditions. To avoid such undesired contact, a relatively large clearance may be defined between a tip of the fan blade and the containment casing. Although such large clearances mitigate undesired contact, they further result in efficiency and performance losses (e.g., increased fuel consumption) at the propulsion system due to the larger clearances.

As such, there is a need for a containment casing that mitigates undesired contact with the fan rotor and improves efficiency and performance of the propulsion system.

BRIEF DESCRIPTION

Aspects and advantages of the invention will be set forth in part in the following description, or may be obvious from the description, or may be learned through practice of the invention.

A propulsion system including a casing surrounding a fan rotor assembly is provided. The casing includes an outer layer material defining a first coefficient of thermal expansion (CTE) and an inner layer material. The casing further includes a spring member disposed between the outer layer material and the inner layer material coupling the outer layer material and the inner layer material. The spring member is coupled to each of the outer layer material and the inner layer material within a flow passage defined between the outer layer material and the inner layer material. The spring member defines a second CTE greater than the first CTE.

In one embodiment, the flow passage is defined between an inner surface of the outer layer material and an outer surface of the inner layer material.

In another embodiment, the spring member is disposed within the flow passage. The spring member is coupled directly to the inner surface of the each of the outer layer material and the inner layer material.

In various embodiments, the propulsion system further includes a first bleed system configured to provide a first flow of fluid to the flow passage at the casing. In one embodiment, the first bleed system is in fluid communication upstream of a second compressor of the propulsion system defined downstream of a first compressor. The first flow of fluid defines a lower temperature than a second flow of fluid at or downstream of the second compressor. In another embodiment, the first bleed system comprises a first walled conduit coupled to the first compressor or an atmospheric air source. The first walled conduit provides fluid communication of the first flow of fluid to the flow passage defined within casing.

In still various embodiments, the propulsion system further includes a second bleed system configured to provide a second flow of fluid to the flow passage at the casing. In one embodiment, the second bleed system is in fluid communication with a second compressor of the propulsion system downstream of a first compressor. The second flow of fluid defines a higher temperature than a first flow of fluid upstream of the second compressor. In another embodiment, the second bleed system comprises a second walled conduit coupled in fluid communication to the second compressor and the flow passage within the casing.

In one embodiment, the inner layer material defines a trench disposed radially outward of a fan blade of the fan rotor assembly. The trench is filled with a filler material configured to dissipate energy when contacted by the fan blade.

Another aspect of the present disclosure is directed to a system for active clearance control at a propulsion system. The system includes a casing surrounding a fan rotor surrounded, wherein the casing comprises an outer layer material defining a first coefficient of thermal expansion (CTE) and an inner layer material, and wherein the casing further comprises a spring member coupled to the outer layer material and the inner layer material within a flow passage defined therebetween. The spring member defines a second CTE greater than the first CTE. The system further includes a fluid device configured to produce a pressurized flow of fluid. The system still further includes a walled conduit assembly coupled in fluid communication at the fluid device and the casing. The system includes a controller configured to perform operations in which the operations include producing the pressurized flow of fluid at the fluid device; flowing the flow of fluid from the fluid device to the flow passage at the casing; and modulating a clearance between the casing and the fan rotor based at least on a temperature of the flow of fluid at the flow passage.

In one embodiment of the system, the operations further include determining a first temperature at the outer layer material of the casing; determining a second temperature at the inner layer material of the casing; and determining the clearance between the casing and the fan rotor based at least on the temperature of the flow of fluid at the flow passage, the first temperature, and the second temperature.

In another embodiment, the operations further include determining from where at the compressor section at which the flow of fluid is extracted based at least on a desired temperature of the flow of fluid at the flow passage at the casing.

In still another embodiment, the operations further include flowing the flow of fluid from a first compressor of the compressor section to the flow passage of the casing; and increasing a propulsion system inlet area at the casing based on the flow of fluid from the first compressor.

In yet another embodiment, the operations further include flowing the flow of fluid from a second compressor of the compressor section to the flow passage of the casing; and decreasing a propulsion system inlet area at the casing based on the flow of fluid from the second compressor.

In still yet another embodiment, modulating the clearance between the casing and the fan rotor based at least on a temperature of the flow of fluid at the flow passage is further based on expansion and contraction of the spring member in contact with the flow of fluid.

Another aspect of the present disclosure is directed to a method for active clearance control at a containment casing of a propulsion system. The method includes producing a pressurized flow of fluid via a fluid device; flowing the flow of fluid from the fluid device to a flow passage at a casing surrounding a fan rotor assembly; and modulating a clearance between the casing and the fan rotor assembly based at least on a temperature of the flow of fluid at the flow passage.

In one embodiment, the method further includes modulating a temperature of the flow of fluid at the flow passage at the casing based on a desired expansion and contraction of a spring member at the casing in contact with the flow of fluid.

In another embodiment, the method further includes determining a first temperature at an outer layer material of the casing; determining a second temperature at the inner layer material of the casing; and determining the clearance between the casing and the fan rotor based at least on the temperature of the flow of fluid at the flow passage, the first temperature, and the second temperature.

In still another embodiment, the method further includes determining from where at the fluid device at which the flow of fluid is extracted based at least on a desired temperature of the flow of fluid at the flow passage at the casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
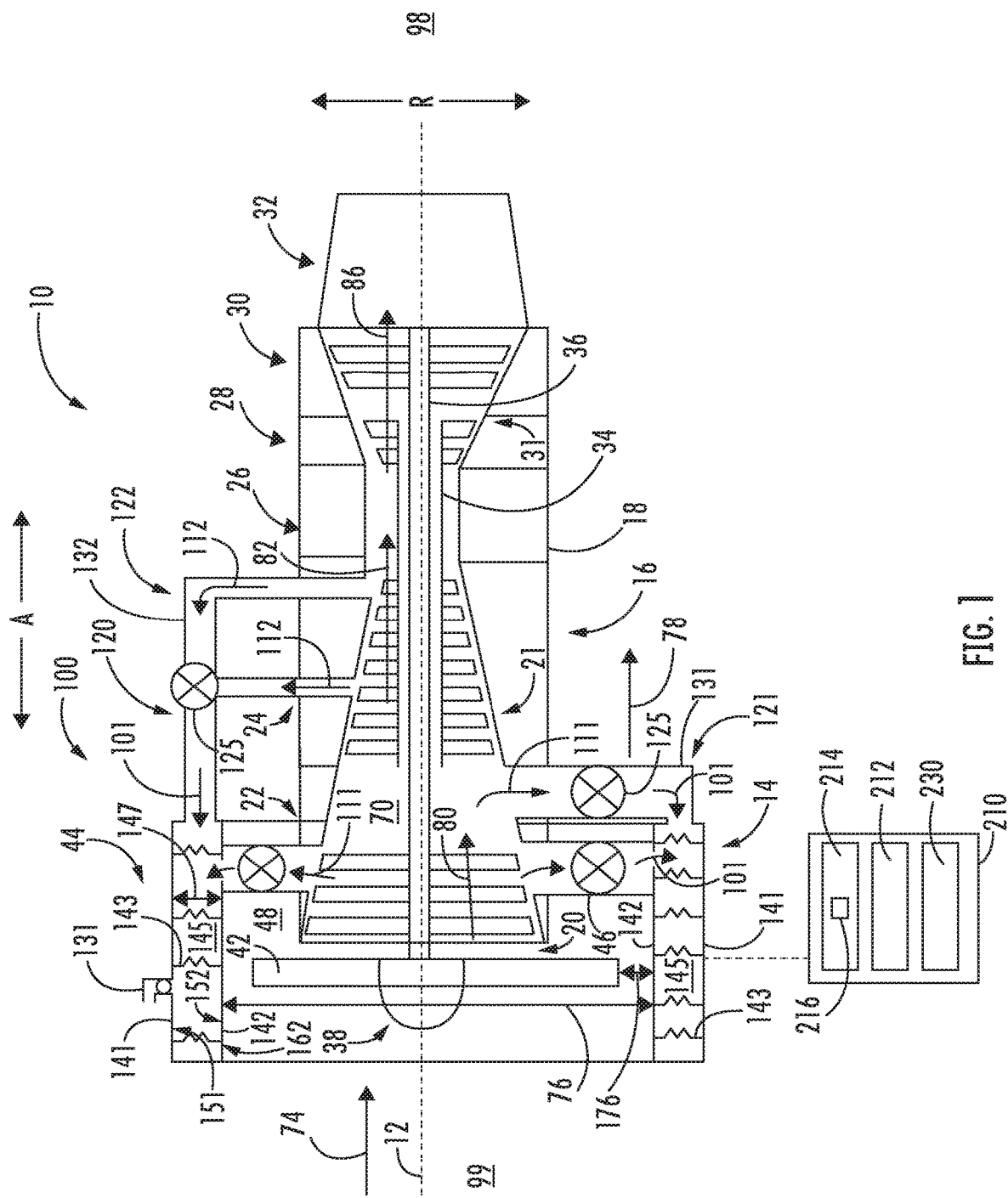
FIG. 1 is an exemplary embodiment of an active clearance control system for a propulsion system according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a system for active clearance control at a containment casing for a propulsion system are generally provided. The embodiments of the system generally provided herein include a containment casing that mitigates undesired contact with the fan rotor it surrounds while further improving efficiency and performance of the propulsion system. The system provides a modulated clearance control system via spring members within the casing to adjust clearance at the fan blade based at least on differences in the coefficient of thermal expansion and responses thereof to temperature modulations.

Referring now to the drawings, FIG. 1 is a schematic partially cross-sectioned side view of an exemplary propulsion system 10 herein referred to as "engine 10" as may incorporate various embodiments of the present invention. Although further described herein as a turbo machine, the engine 10 may define a turbofan, turboshaft, turboprop, or turbojet gas turbine engine, including marine and industrial engines and auxiliary power units. Additionally, or alternatively, although described herein as a turbo machine, the engine 10 may define a fan assembly, such as an electric propulsion system, a hybrid electric propulsion system, a boundary layer fan, or other fan rotor structure generally surrounded by a containment casing (e.g., casing 44).

As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14.

The core engine 16 may generally include a substantially tubular outer casing 18 that defines a core inlet 20 to a core flowpath 70. The outer casing 18 encases or at least partially forms the core engine 16. The outer casing 18 encases or at least partially forms, in serial flow relationship, a compressor section 21 having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan rotor assembly 38 of the fan assembly 14. In particular embodiments, as shown in FIG. 1, the LP rotor shaft 36 may be connected to the fan rotor assembly 38 via a reduction gear such as in an indirect-drive or geared-drive configuration.

As shown in FIG. 1, the fan assembly 14 includes a plurality of fan blades 42 that are coupled to and extend radially outwardly from the fan rotor assembly 38. A casing 44 circumferentially surrounds the fan assembly 14 and/or at least a portion of the core engine 16. It should be appreciated by those of ordinary skill in the art that the casing 44 may be configured to be supported relative to the core engine 16 by a plurality of circumferentially-spaced outlet guide vanes or struts 46. Moreover, at least a portion of the casing 44 may extend over an outer portion of the core engine 16 so as to define a bypass airflow passage 48 therebetween.

The engine 10 further includes a system 100 for active clearance control at the casing 44. In various embodiments, the compressor section 21 and/or the fan assembly 14, or both in combination, may define a fluid device 110 configured to provide a flow of fluid 101 to the casing 44, such as further described below.

It should be appreciated that combinations of the shaft 34, 36, the compressors 22, 24, and the turbines 28, 30 define a rotor assembly of the engine 10. For example, the HP shaft 34, HP compressor 24, and HP turbine 28 may define an HP rotor assembly of the engine 10. Similarly, combinations of the LP shaft 36, LP compressor 22, and LP turbine 30 may define an LP rotor assembly of the engine 10. Various embodiments of the engine 10 may further include the fan rotor assembly 38 and fan blades 42 as the LP rotor assembly. In other embodiments, the engine 10 may further define a fan rotor assembly at least partially mechanically de-coupled from the LP spool via the fan rotor assembly 38. Still further embodiments may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or casing 44. A portion of air, shown schematically by arrows 80, enters the flowpath 70 at the core engine 16 through the core inlet 20 defined at least partially via the casing 18. The flow of air 80 is increasingly compressed as it flows across successive stages of the compressors 22, 24, such as shown schematically by arrows 82. The compressed air 82 enters the combustion section 26 and mixes with a liquid or gaseous fuel and is ignited to produce combustion gases 86. The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the bypass airflow passage 48, such as shown schematically by arrows 78.

Figure 2:
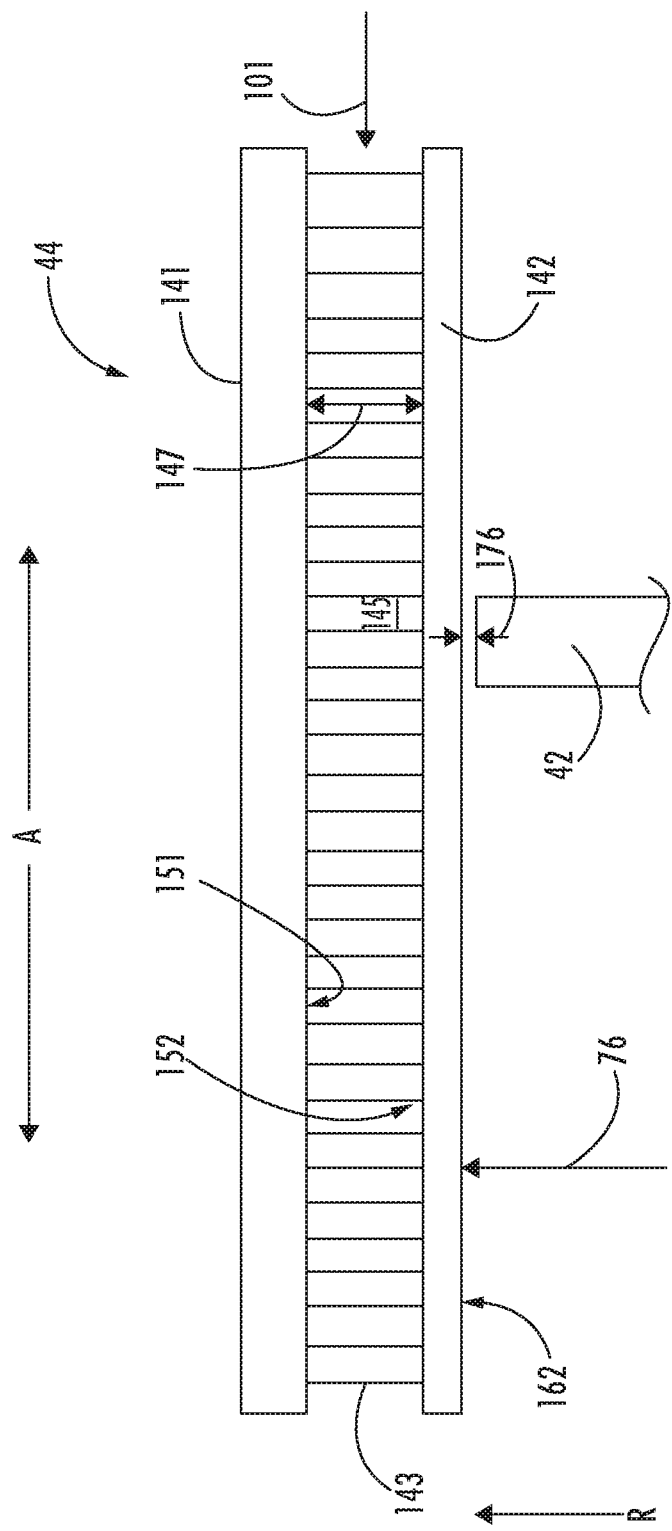
FIGS. 2-3 are schematic cross sectional views of a casing of the exemplary propulsion system provided in regard to FIG. 1.
Figure 3:
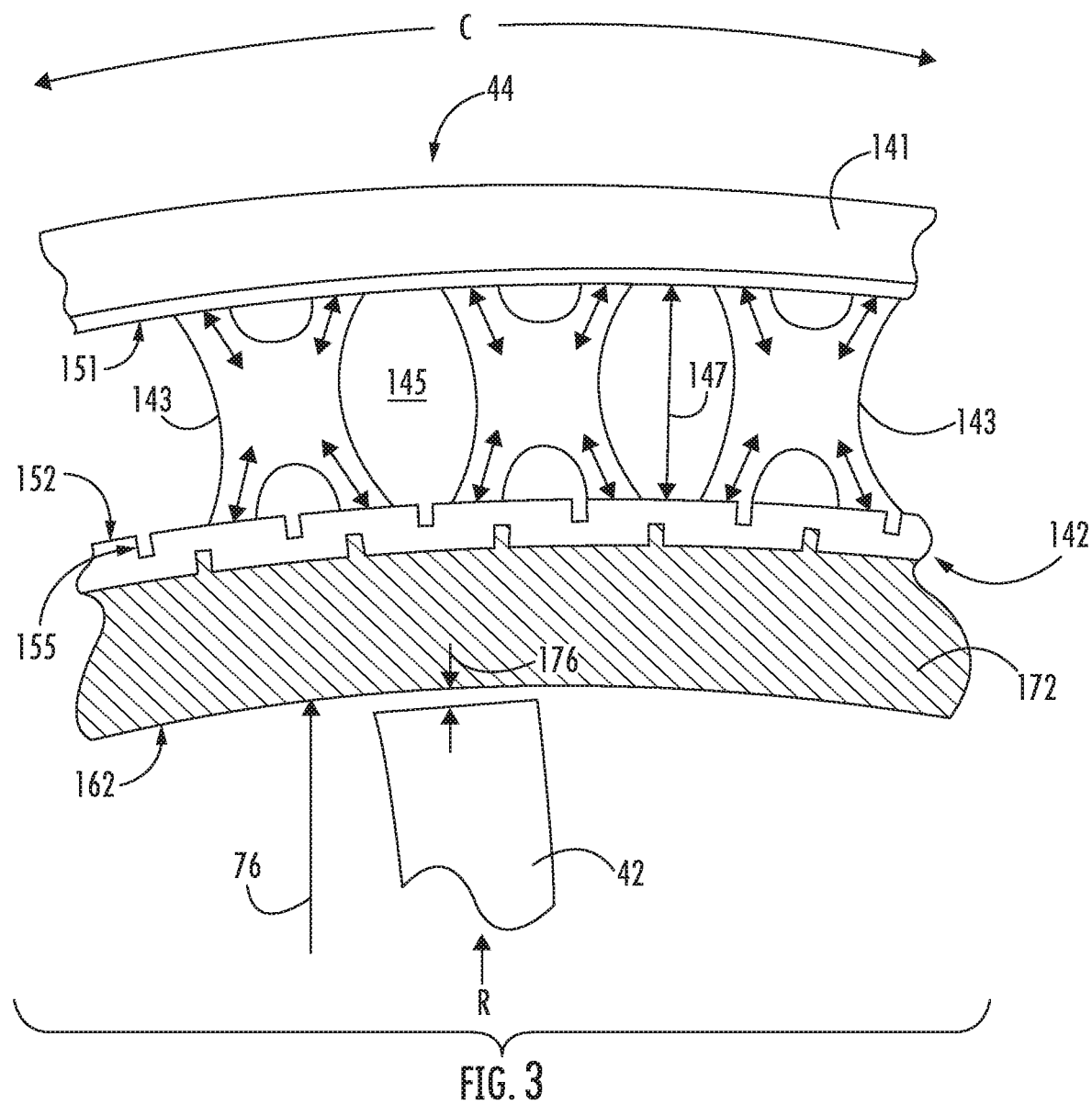

Referring now to FIGS. 2-3, schematic cross sectional views of the casing 44 surrounding the fan blade 42 of the fan rotor assembly 38 (FIG. 1) is generally provided. The casing 44 includes an outer layer material 141 defining a first coefficient of thermal expansion (CTE) and an inner layer material 142. The casing 44 further includes a spring member 143 disposed between the outer layer material 141 and the inner layer material 142. Various embodiments of the spring member 143 may define fins, ligaments, lattice structures, fingers, or other appropriate springing structures that enable a desired expansion and contraction based on changes in temperature and the coefficient of thermal expansion for the spring member 143. The spring member 143 couples the outer layer material 141 and the inner layer material 142 together in moveable arrangement along the radial direction R. The outer layer material 141 and the inner layer material 142 together define a flow passage 145. The spring member 143 is coupled to each of the outer layer material 141 and the inner layer material 142 within the flow passage 145. The spring member 143 defines a second CTE greater than the first CTE of the outer layer material 141. As such, the spring member 143 enables increase and decrease of a radial cross sectional area 147 of the flow passage 145 based on a temperature at the spring member 143.

In various embodiments, the flow passage 145 is more particularly defined between an inner surface 151 of the outer layer material 141 and an outer surface 152 of the inner layer material 142. The inner layer material 142 further defines an inner surface 162 corresponding to the inlet area 76 of the casing 44. For example, the inner surface 162 along the radial direction R may generally correspond to a diameter of the inlet area 76, such that the casing 44 may define a substantially annular geometry. However, in other embodiments, the casing 44 may define a non-annular inlet area 76 (e.g., defining a two-dimensional opening, such as a major axis and a minor axis).

In one embodiment, the spring member 143 is disposed within the flow passage 145 and attached or otherwise coupled directly to the inner surface 151 of the outer layer material 141 and the outer surface dimension 152 of the inner layer material 142.

During operation of the engine 10, a flow of fluid 101 (FIGS. 1-2) is provided to the flow passage 145 between the outer layer material 141 and the inner layer material 142 of the casing 44. The spring member 143, defining the second CTE, expands or contracts based on a temperature of the flow of fluid 101. As such, the radial cross sectional area 147 of the flow passage 145 is increased or decreased based at least on a difference between the second CTE of the spring member 143 and the first CTE of the outer layer material 141. Additionally, the inlet area 76, and a clearance 176 between the blade 42 and the inner surface 162 of the inner layer material 142, is adjusted based on expansion and contraction of the spring member 143 and changes in the radial cross sectional area 147.

In various embodiments, the clearance 176 may be adjusted or controlled to be substantially constant across a plurality of different or changing operating conditions of the engine 10. For example, the clearance 176 may be adjusted via changes in the temperature of the flow of fluid 101 and modulation or adjustment of the radial cross sectional area 147 at the flow passage 145 based at least on the difference in the first CTE of the outer layer material 141 and the second CTE of the spring member 143. Adjustment of the clearance 176 may be controlled to be substantially constant across a plurality of temperatures, pressures, or other parameters of the volume of air 74 entering the engine 10 via the inlet 76 of the casing 44.

In other embodiments, the clearance 176 is adjusted or controlled to provide a desired increased or decreased clearance 176 based on operating condition of the engine 10. For example, the clearance 176 may be increased (e.g., the spring member 143 contracts to decrease the radial cross sectional area 147 at the flow passage 145) to decrease or mitigate contact of the blade 42 with the inner layer material 142 of the casing 44. As another example, the clearance 176 may be decreased (e.g., the spring member 143 expands to increase the radial cross sectional area 147 at the flow passage 145) to improve efficiency, performance, or operability at the fan rotor assembly 38 (FIG. 1).

Referring now to FIG. 3, the inner layer material 142 may further include a filler material 172 at the inner surface 162 of the inner layer material 142 configured to dissipate energy when contacted by the fan blade 42. In various embodiments, the filler material 172 may include one or more materials appropriate for dissipating energy when the fan blade 42 rubs, hard contacts, or liberates, onto the casing 44. In one embodiment, the filler material 172 includes a composite material, such as a fibrous composite material including a plurality of fibers within one or more composite sheets in radial arrangement at the inner surface 162 of the inner layer material 142. For example, the filler material 172 may include a plurality of sheets of fibrous composite material including a pre-impregnated with polymeric resin or epoxy and a curing agent (prepreg). As another example, the filler material 172 includes a thermoplastic material including a thermoplastic carrier. In still various embodiments, the filler material 172 generally defines an abradable material configured to allow controlled removal of the filler material 172 as the fan blade 42 contacts the filler material 172.

Referring still to the axial sectional view provided in FIG. 3, in conjunction with FIGS. 1-2, the spring member 143 may be extended at least partially along the axial direction A within the flow passage 145. In one embodiment such as depicted in regard to FIG. 3, the spring member 143 may extend substantially along the axial direction A (FIG. 1) corresponding to a chord dimension of the fan blade 42. In another embodiment, the spring member 143 may extend substantially along the entire flow passage 145 of the casing 44.

In still various embodiments in reference to FIG. 3, the spring member 143 may define one or more geometries including fins, ligaments, fingers, stars or other multi-pronged polygons attached directly to the inner surface 151 of the outer layer material 141 and the outer surface 152 of the inner layer material 142. In one embodiment, such as depicted in regard to FIG. 3, the engine 10 and system 100 include a plurality of the spring members 143 in adjacent arrangement along a circumferential direction C (FIG. 3) through the flow passage 145 relative to the axial centerline axis 12 (FIG. 1).

In another embodiment, the plurality of spring members 143 may be extended substantially along the circumferential direction C and in a plurality of rows along the axial direction A. In still another embodiment, the spring members 143 may be arranged in plurality along the axial direction A and the circumferential direction C, such as generally depicted in regard to FIGS. 2-3.

Referring still to FIG. 3, the inner layer material 142 may generally define a compliant material such as to enable expansion and contraction of the inner layer material 142 corresponding to expansion and contraction of the spring members 143 attached thereto. The embodiments of the spring member 143 arranged along the axial direction A and the circumferential direction C, such as described above, may enable expansion and contraction of the inner layer material 142 such as to desirably change the inlet area 76 and the clearance 176 between the casing 44 and the fan rotor assembly 38.

In various embodiments, the inner layer material 142 includes a plurality of openings 155 extended partially through the inner layer material 142. The plurality of openings 155 extend partially through the inner layer material 142 along the radial direction R, such as to enable compliance of the inner layer material 142 relative to expansion and contraction of the spring members 143. In a more particular embodiment, the inner layer material 142 is extended circumferentially around the axial centerline axis 12, such as a unitary structure. The openings 155 extend partially through the inner layer material 142 along the radial direction R such as to enable expansion and contraction of the inner layer material 142 such as to desirably change the inlet area 76 and the clearance 176. In various embodiments, the openings 155 may extend at least partially along the axial direction A. In one embodiment, the openings 155 extend substantially along the axial direction A of the flow passage 145. In another embodiment, the openings 155 extend partially along the axial direction A of the flow passage 145 relative to a chord of the fan blade 42.

Figure 4:
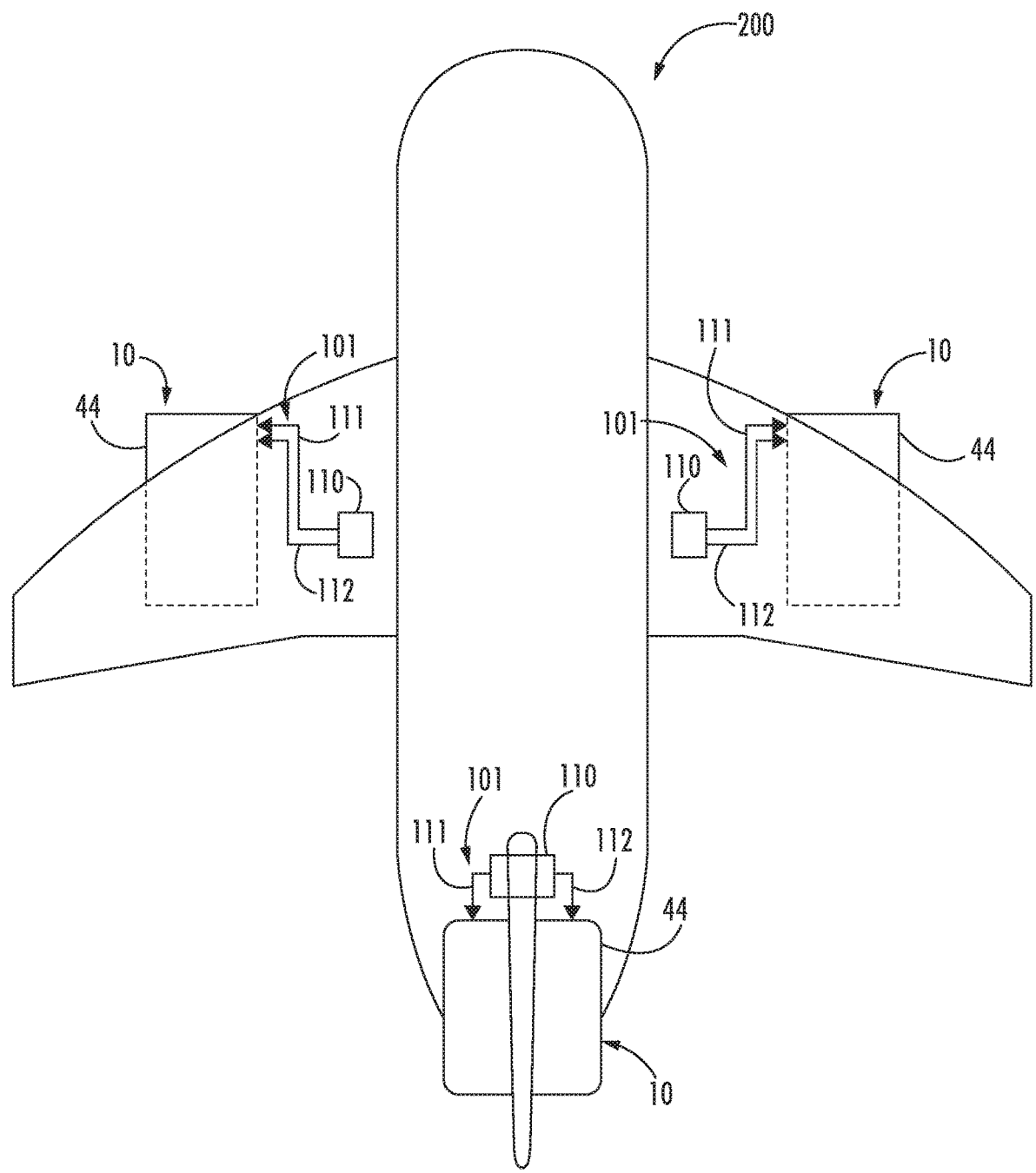
FIG. 4 is an exemplary embodiment of an aircraft including an embodiment of an active clearance control system for a propulsion system according to an aspect of the present disclosure.

Referring now to FIG. 4, a schematic embodiment of an aircraft 200 including and embodiment of the system 100 for active clearance control at the casing 44 of the engine 10 is generally provided. In various embodiments, the aircraft 200 may include a fixed wing aircraft, a rotary wing aircraft, a tilt-rotor aircraft, a vertical takeoff and landing (VTOL) vehicle, or other aircraft or vehicle suitable for an active clearance control at an inlet casing of a propulsion system.

The aircraft 200 includes various embodiments of the system 100 including the casing 44 of the engine 10 shown and described in regard to FIGS. 1-3. The aircraft 200 further includes the fluid device 110 configured to produce and provide the pressurized flow of fluid 101 at a plurality of temperatures, such as to expand and contract the spring members 143 and increase and decrease, respectively, the radial cross sectional area 147 at the flow passage 145 of the casing 44, such as described in regard to FIGS. 1-3. Referring to FIGS. 1-4, the system 100 further includes a walled conduit assembly 120 coupled in fluid communication at the fluid device 110 and the casing 44, such as to provide the flow of fluid 101 from the fluid device 110 to the flow passage 145 of the casing 44.

Referring to FIG. 4, the fluid device 110 may define a device at the aircraft to provide a desired temperature and/or pressure of the flow of fluid 101 to the casing 44. For example, the fluid device 110 may include an auxiliary power unit, air turbine, or a "no-bleed" system of the aircraft 200. In still various embodiments, such as described above, the engine 10 may include gas turbine engines, electric propulsion systems, hybrid electric propulsion systems, or boundary layer fans, or other systems in which active clearance control between the casing 44 and the fan rotor assembly 38 is desired to improve efficiency, performance, and/or operability.

Referring to FIG. 1, in various embodiments, the fluid device 110 generally includes the compressor section 21 of the engine 10. For example, the fluid device may include a first compressor, such as the LP compressor 22 and/or fan rotor assembly 38. In another embodiment, the fluid device 110 includes, additionally, or alternatively, a second compressor, such as the HP compressor 24.

Referring still to FIG. 1, in various embodiments the walled conduit assembly 120 of the system 100 further includes a first bleed system 121 configured to provide a first flow of fluid 111 to the flow passage 105 at the casing 44. In one embodiment, the first bleed system 121 is coupled in fluid communication upstream (e.g., toward the upstream end 99) of the second compressor (e.g., the HP compressor 24 defined downstream of the first compressor or LP compressor 22) of the engine 10.

In one embodiment, the first bleed system 121 includes a first walled conduit 131 coupled to the first compressor (e.g., LP compressor 22 or fan assembly 14) or an atmospheric air source. For example, in one embodiment, the first walled conduit 131 may be extended through the struts 46 supporting the casing 44 around the fan rotor assembly 38. As another example, the first walled conduit 131 may extend from the casing 44 to receive a flow of air from the atmospheric air source (e.g., outside of the casing 44). In still another embodiment, the first walled conduit 131 is coupled to the first compressor defining the LP compressor 22, such as to extract the first flow of fluid 111 from the flowpath 70 at or downstream of the LP compressor 22 and upstream of the HP compressor 24. In still various embodiments, the first walled conduit 131 may define a portion of a bifurcated bleed system. The various embodiments of the first walled conduit 131 are coupled in fluid communication with the flow passage 145 at the casing 44 to provide the first flow of fluid 111 to the flow passage 145 as the flow of fluid 101 described herein.

Referring still to FIG. 1, in various embodiments the walled conduit assembly 120 of the system 100 further includes a second bleed system 122 configured to provide a second flow of fluid 112 to the flow passage 145 at the casing 44. In one embodiment, the second bleed system 122 is coupled in fluid communication downstream (e.g., toward the downstream end 98) of the first compressor (e.g., the LP compressor 22 defined upstream of the second compressor or HP compressor 24) of the engine 10.

In one embodiment, the second bleed system 122 includes a second walled conduit 132 coupled to the second compressor (e.g., HP compressor 24). For example, the second walled conduit 132 may be coupled to the second compressor defining the HP compressor 24, such as to extract the second flow of fluid 112 from the flowpath 70 at the HP compressor 24. In still various embodiments, the second walled conduit 132 may define a portion of an environmental control system (ECS) bleed. The various embodiments of the second walled conduit 132 are coupled in fluid communication with the flow passage 145 at the casing 44 to provide the second flow of fluid 112 to the flow passage 145 as the flow of fluid 101 described herein.

It should be appreciated that as the air 82 is compressed through the flowpath 70 of the engine 10, the pressure and temperature of the air 82 generally rises across successive stages of the first compressor or LP compressor 22 and the second compressor or HP compressor 24. As such, the first flow of air 111 from the first compressor generally defines a lower pressure and temperature than the second flow of air 112 from the second compressor. More generally, the flows of air extracted from the flowpath are generally at a higher pressure and temperature relative to other flows extracted upstream thereof.

In still various embodiments, the walled conduit assembly 120 includes one or more valves 125 disposed therein to enable modulation of the flows 111, 112 to the flow passage 145 of the casing 44. For example, the valves 125 may be disposed at one or more of the first walled conduit 131, the second walled conduit 132, or both. The valves 125 may be communicatively coupled to a controller 210 (further described below) such as to enable the first flow of fluid 111, the second flow of fluid 112, or a mixture thereof, to enter the flow passage 145 as the flow of fluid 101. As another example, such as further described in regard to method 1000 below, the valves 125 may modulate the flows 111, 112, or mixtures thereof, based on a desired temperature of the flow of fluid 101 at the flow passage 145.

In various embodiments, the system 100 further includes a controller 210 configured to perform operations. The controller 210 may be included with embodiments of the engine 10, such as depicted in regard to FIG. 1. The controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions. In various embodiments, the controller 210 may be configured to flow the fluid 101 from the fluid device 110 to the flow passage 145 at the casing 44 such as to modulate the clearance 176 between the casing 44 and the fan blade 42 based at least on a temperature of the flow of fluid 101 at the flow passage 145, such as described in regard to FIGS. 1-3.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations, such as determining a desired clearance 176 between the casing 44 and the fan blade 42 based on the temperature of the flow of fluid 101, or determining one or more temperatures of the flow of fluid 101 to be provided to the flow passage 145 from the fluid device 110.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the outer layer material 141, the inner layer material 142, the spring member 143, and the flow of fluid 101, such as a temperature, pressure, flow rate, or other operational parameter, or combinations thereof. The communications interface module 230 may receive and send data corresponding to the operational parameter from a sensor. In addition, the communications interface module 230 can also be used to communicate with any other suitable components of the engine 10, including any number of sensors configured to monitor one or more operating parameters of the engine 10.

It should be appreciated that the communications interface module 230 can be any combination of suitable wired and/or wireless communications interfaces and, thus, can be communicatively coupled to one or more components of the engine 10 via a wired and/or wireless connection. As such, the controller 210 may communicate with one or more sensors to determine a desired expansion or contraction of the spring member 143, a desired increase or decrease in radial cross sectional area 147, a desired inlet area 76, or a desired clearance 176.

Figure 5:
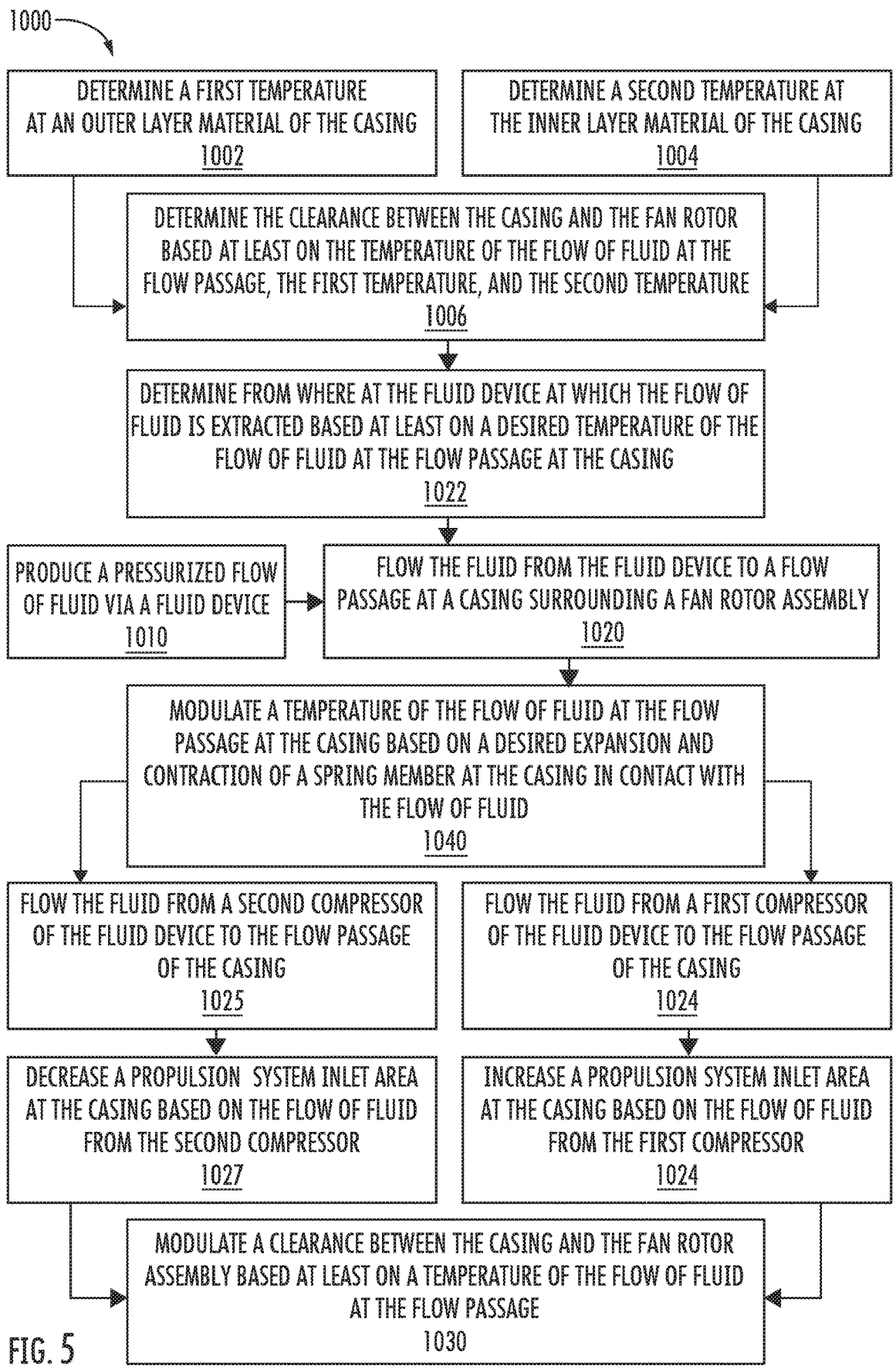
FIG. 5 is a flowchart outlining exemplary steps of a method for active clearance control at a containment case for a propulsion system.

Referring now to FIG. 5, a flowchart outlining exemplary steps of a method for active clearance control at a containment casing (e.g., the casing 44 of the fan assembly 14) for a propulsion system is generally provided (hereinafter, "method 1000"). The method 1000 may define steps or operations performed by one or more computing devices of a propulsion system or aircraft, such as via the system 100 including the controller 210 at the engine 10 or aircraft 200 shown and described in regard to FIGS. 1-4. However, it should be appreciated that the method 1000 may be performed via other structures, systems, or computing devices not provided herein.

Referring to FIG. 5, in conjunction with FIGS. 1-4, the method 1000 includes at 1010 producing a pressurized flow of fluid via a fluid device (e.g., fluid device 110 producing flow 101); at 1020 flowing the flow of fluid from the fluid device to a flow passage at a casing surrounding a fan rotor assembly (e.g., providing flow 101 to the flow passage 145 of the casing 44 surrounding the fan blades 42 of the fan rotor assembly 38); and at 1030 modulating a clearance between the casing and the fan rotor assembly based at least on a temperature of the flow of fluid at the flow passage (e.g., modulating clearance 176 between the inner surface 162 of the inner layer material 142 of the casing 44 and the tip of the fan blade 42).

In one embodiment, the method 1000 further includes at 1040 modulating a temperature of the flow of fluid at the flow passage at the casing based on a desired expansion and contraction of a spring member at the casing in contact with the flow of fluid, such as shown and described in regard to FIGS. 1-4.

In another embodiment, the method 1000 further includes at 1002 determining a first temperature at an outer layer material of the casing (e.g., outer layer material 141); at 1004 determining a second temperature at the inner layer material of the casing (e.g., inner layer material 142); and at 1006 determining the clearance between the casing and the fan rotor based at least on the temperature of the flow of fluid at the flow passage, the first temperature, and the second temperature.

For example, referring to FIGS. 1-3, determining the first temperature at the outer layer material 141 of the casing 44 may include referencing, via the controller 210, a predetermined table, chart, function, schedule, etc. (e.g., stored in the memory 214 of the controller 210), in which the first CTE of the outer layer material 141 is compared to an altitude at which the casing 44 (or furthermore, the engine 10 and/or the aircraft 200) is in versus a period of time at the altitude. For example, the altitude at which the outer layer material 141 is in may correspond to an outside air temperature at the altitude, and the period of time compared to the first CTE of the outer layer material 141 may be used to determine the first temperature of the outer layer material 141. It should be appreciated in other exemplary embodiments, the first CTE of the outer layer material 141 may be additionally, or alternatively, compared to an outside air pressure, density, temperature, air speed, altitude, or combinations thereof, versus a period of time, to determine the first temperature at the outer layer material 141.

As another example, one or more sensors may be disposed within or on a surface (e.g., inner surface 151) of the outer layer material 141 to determine the first temperature. It should be appreciated that the one or more sensors may be communicatively coupled to the controller 210 to send temperature data or other data used to determine the first temperature.

In still other examples, determining the second temperature at the inner layer material 142 of the casing 44 may include referencing, via the controller 210, a predetermined table, chart, function, schedule, etc. (e.g., stored in the memory 214 of the controller 210), in which a coefficient of thermal expansion of the inner layer material 142 is compared to a temperature, pressure, density, or other operational parameter of the volume of air 74 (FIG. 1) entering the inlet area 76. For example, the volume of air 74 entering the inlet area 76 is in thermal communication with the inner surface 162 of the inner material layer 142. In various embodiments, determining the second temperature at the inner layer material 142 may be determined via the controller 210 such as described in regard to determining the first temperature at the outer layer material 141.

In still various embodiments, the method 1000 at 1006 in which the clearance between the casing and the fan rotor is determined based at least on the temperature of the flow of fluid at the flow passage, the first temperature, and the second temperature includes determining, via the controller 210, the clearance 176 based on expansion or contraction of the spring member 143 including the second CTE relative to expansion or contraction of the outer layer material 141 including the first CTE different from the second CTE. For example, the temperature of the flow of fluid 101 at the flow passage 145 changes or otherwise adjusts expansion or contraction of the spring member 143. The first temperature at the outer layer material 141 and the second temperature at the inner layer material 142 may each further determine expansion or contraction of each respective layer material 141, 142. Differences in the expansion or contraction at the spring member 143 versus expansion or contraction at each of the outer layer material 141 and inner layer material 142 at least partially determine the radial cross sectional area 147 at the flow passage 145. Changes, adjustments, or modulation of the radial cross sectional area 147, via changes in the spring member 143, or expansion or contraction of the spring member 143 relative to the outer layer material 141 and/or inner layer material 142, determine or otherwise modulate changes in the clearance 176 between the fan blade 42 and the inner surface 162 of the inner layer material 142. As such, the method 1000 at 1030 at which the clearance between the casing and the fan rotor is modulated based at least on a temperature of the flow of fluid at the flow passage is further based on expansion and contraction of the spring member in contact with the flow of fluid.

In still various embodiments, the method 1000 further includes at 1022 determining from where at the fluid device (e.g. fluid device 110) at which the flow of fluid is extracted based at least on a desired temperature of the flow of fluid at the flow passage at the casing. For example, such as described above in regard to steps 1006 and 1030, the clearance 176 is based at least on expansion and contraction of the spring member 143, in which differences between the second CTE of the spring member 143 and the first CTE of the outer layer material 141 enable adjustment, modulation, alternation, or otherwise changing the radial cross sectional area 147 at the flow passage 145 such as to modulate the clearance 176 between the fan blade 42 and the inner surface 162 of the inner layer material 142.

In one embodiment, such as depicted in regard to FIG. 1, the method 1000 at 1022 includes determining which of the first flow of fluid 111 or the second flow of fluid 112, or a mixture thereof, is extracted from the respective first compressor (e.g., LP compressor 22 or fan assembly 14) or second compressor (e.g., HP compressor 24) such as to provide the flow of fluid 101 at the flow passage 145 at the desired temperature such as to adjust the clearance 176 such as described above.

Referring back to FIGS. 1-4, in conjunction with FIG. 5, in one embodiment, the method 1000 at 1024 includes flowing the flow of fluid (e.g., the first flow of fluid 111) from a first compressor of the fluid device (e.g., fan assembly 14 and/or LP compressor 22) to the flow passage of the casing; and at 1026 increasing a propulsion system inlet area (e.g., inlet area 76) at the casing based on the flow of fluid from the first compressor, such as described in regard to FIGS. 1-4, and such as to adjust or modulate the clearance 76 between the casing 44 and the fan blade 42.

Referring still to FIGS. 1-4, in conjunction with FIG. 5, in another embodiment, the method 1000 at 1025 includes flowing the flow of fluid (e.g., second flow of fluid 112) from a second compressor of the fluid device (e.g., HP compressor 24) to the flow passage of the casing; and at 1027 decreasing a propulsion system inlet area (e.g., inlet area 76) at the casing based on the flow of fluid from the second compressor, such as described in regard to FIGS. 1-4, and such as to adjust or modulate the clearance 76 between the casing 44 and the fan blade 42.

Embodiments of the system 100 for active clearance control at the containment casing 44 for the propulsion system 10 may mitigate undesired contact with the fan rotor assembly 38 while further improving efficiency and performance of the propulsion system 10. The system 100 provides a modulated clearance control system via spring members 143 within the casing 44 to adjust clearance 176 at the fan blade 42 based at least on differences between the first coefficient of thermal expansion at the outer layer material 141 and the second coefficient of thermal expansion at the spring members 143. Temperature is modulated at the flow passage 145 at the casing 44 such as to provide a desired expansion and contraction of the spring member 143, thereby increasing or decreasing the clearance 176 between the inner surface 162 of the casing 44 and the tip of the fan blade 42 as desired to improve performance, operability, and efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A casing to surround a fan rotor assembly, the casing comprising:
    an outer layer material;
    an inner layer material including:
        first openings extended partially through the inner layer material along a radial direction of a first side of the inner layer material; and
        second openings extended partially through the inner layer material along the radial direction of a second side of the inner layer material opposite the first side; and
    a spring member coupled to the outer layer material and the inner layer material, the spring member disposed between the outer layer material and the inner layer material within a flow passage defined between an inner surface of the outer layer material and the first side of the inner layer material.

2. The casing of claim 1, wherein the first openings and the second openings are configured to enable expansion and contraction of the inner layer material along the radial direction.

3. The casing of claim 1, wherein the outer layer material has a first coefficient of thermal expansion (CTE) and the spring member has a second CTE greater than the first CTE.

4. The casing of claim 1, wherein the spring member is extended at least partially along at least one of an axial direction or a circumferential direction within the flow passage.

5. The casing of claim 1, wherein the spring member defines a geometry based on a fin, a ligament, a lattice structure, a finger, a star, or multi-pronged polygon.

6. The casing of claim 1, wherein the fan rotor assembly has a fan blade, the inner layer material defines a trench disposed radially outward of the fan blade, and the trench is to be filled with a filler material configured to dissipate energy when contacted by the fan blade.

7. The casing of claim 6, wherein the filler material is a fibrous composite material including a plurality of fibers within one or more composite sheets in a radial arrangement at the inner layer material.

8. The casing of claim 6, wherein the filler material includes a plurality of sheets of fibrous composite material, the fibrous composite material pre-impregnated with a curing agent and a polymeric resin or epoxy.

9. The casing of claim 6, wherein the filler material includes a thermoplastic material including a thermoplastic carrier.

10. A propulsion system comprising:
    a fan rotor assembly; and
    a casing surround the fan rotor assembly, the casing including:
        an outer layer material;
        an inner layer material including:
            first openings extended partially through the inner layer material along a radial direction of a first side of the inner layer material; and
            second openings extended partially through the inner layer material along the radial direction of a second side of the inner layer material opposite the first side; and
        a spring member coupled to the outer layer material and the inner layer material the spring member disposed between the outer layer material and the inner layer material within a flow passage defined between an inner surface of the outer layer material and the first side of the inner layer material.

11. The propulsion system of claim 10, wherein the first openings and the second openings are configured to enable expansion and contraction of the inner layer material along the radial direction.

12. The propulsion system of claim 10, further including:
    a low pressure compressor;
    a high pressure compressor downstream of the low pressure compressor; and
    a walled conduit having a first conduit opening, a second conduit opening, and a third conduit opening, the first conduit opening in fluid communication with the low pressure compressor, the second conduit opening in fluid communication with the high pressure compressor, and the third conduit opening in fluid communication with a combustion section of the propulsion system, the combustion section downstream of the low pressure compressor and the high pressure compressor.

13. The propulsion system of claim 12, further including:
a first valve coupled to the first conduit opening; and
a second valve coupled to the second conduit opening and the third conduit opening.

14. The propulsion system of claim 13, wherein at least one of the first valve or the second valve are to adjust airflow through at least one of the first conduit opening, the second conduit opening, or the third conduit opening, the inner layer material to expand or contract based on the adjusted airflow.

15. The propulsion system of claim 10, wherein the spring member is extended at least partially along at least one of an axial direction or a circumferential direction within the flow passage.

16. A fan assembly comprising:
a fan rotor assembly; and
a casing having a conduit opening in fluid communication with the fan rotor assembly, the casing including:
an outer layer material;
an inner layer material including:
first openings extended partially through the inner layer material along a radial direction of a first side of the inner layer material; and
second openings extended partially through the inner layer material along the radial direction of a second side of the inner layer material opposite the first side; and
a plurality of spring members coupled to the outer layer material and the inner layer material along a circumferential direction of the casing, the plurality of the spring members disposed between the outer layer material and the inner layer material within a flow passage defined between an inner surface of the outer layer material and the first side of the inner layer material.

17. The fan assembly of claim 16, wherein the first openings and the second openings are configured to enable expansion and contraction of the inner layer material along the radial direction.

18. The fan assembly of claim 16, wherein one or more of the plurality of spring members define a geometry based on a fin, a ligament, a lattice structure, a finger, a star, or multi-pronged polygon.

19. The fan assembly of claim 16, further including a fan blade, the inner layer material to define a trench disposed radially outward of the fan blade, and the trench is to be filled with a filler material configured to dissipate energy in response to contact by the fan blade.

20. The fan assembly of claim 19, wherein the filler material is a fibrous composite material including a plurality of fibers within one or more composite sheets in a radial arrangement at the inner layer material.

* * * * *